(12) United States Patent
Koc et al.

(10) Patent No.: US 9,693,271 B2
(45) Date of Patent: Jun. 27, 2017

(54) ADAPTIVE CELL RANGE EXPANSION MECHANISMS FOR LTE CELLS

(71) Applicant: Intel Corporation, Santa Clara, CA (US)

(72) Inventors: Ali T. Koc, Portland, OR (US); Satish C. Jha, Hillsboro, OR (US); Maruti Gupta, Portland, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 12 days.

(21) Appl. No.: 14/105,957

(22) Filed: Dec. 13, 2013

(65) Prior Publication Data

US 2015/0172977 A1    Jun. 18, 2015

(51) Int. Cl.
*H04W 36/00* (2009.01)
*H04W 36/04* (2009.01)
*H04W 36/32* (2009.01)

(52) U.S. Cl.
CPC ........ *H04W 36/0083* (2013.01); *H04W 36/04* (2013.01); *H04W 36/32* (2013.01)

(58) Field of Classification Search
CPC . H04W 36/0055; H04W 36/24; H04W 36/04; H04W 16/08; H04W 24/10; H04W 88/08
See application file for complete search history.

(56) References Cited

U.S. PATENT DOCUMENTS

2010/0035647 A1\* 2/2010 Gholmieh ............. H04W 52/10
455/522

2010/0067375 A1\* 3/2010 Ianev ................... H04W 36/22
370/230

(Continued)

FOREIGN PATENT DOCUMENTS

CN       105706478 A      6/2016
WO    2004-008794 A2     1/2004
(Continued)

OTHER PUBLICATIONS

International Search Report and Written Opinion received for International Application PCT/US2014/064751, mailed on Feb. 10, 2015.
International Preliminary Report on Patentability received for International Patent Application No. PCT/US2014/064751, mailed on Jun. 23, 2016, 10 pages.

*Primary Examiner* — Qun Shen
(74) *Attorney, Agent, or Firm* — Alpine Technology Law Group LLC (57) ABSTRACT

Embodiments disclosed herein relate to devices and methods that provide adaptive CRE-based offset parameters that take into account the speed of a UE and that take into account the DL/UL traffic balance being experienced by the UE. For example, if the speed of a UE is greater than the predefined speed, the UE utilizes an adaptive CRE-based offset parameter that has a low value or is equal to zero. Similarly, if the balance of downlink/uplink traffic being experienced by a UE is mainly downlink traffic, the UE utilizes an adaptive CRE-based offset parameter that has a low value or is equal to zero. Consequently, the embodiments disclosed herein reduce the handover failure associated with CRE particularly for high speed UEs while also being able to increase downlink system capacity if the balance of the downlink and uplink traffic experienced by the UE is mostly downlink traffic.

8 Claims, 7 Drawing Sheets

(56) References Cited

U.S. PATENT DOCUMENTS

| | | | |
|---|---|---|---|
| 2010/0197300 A1* | 8/2010 | Van Der Velde | H04W 36/0088 455/425 |
| 2011/0194527 A1 | 8/2011 | Lin et al. | |
| 2012/0276900 A1* | 11/2012 | Stephens | H04W 24/02 455/436 |
| 2013/0201848 A1* | 8/2013 | Kazmi | H04W 24/00 370/252 |
| 2013/0244664 A1* | 9/2013 | Song | H04W 36/0083 455/437 |
| 2013/0260712 A1 | 10/2013 | Deb et al. | |
| 2014/0023009 A1* | 1/2014 | Abe | H04W 24/10 370/329 |
| 2014/0302853 A1* | 10/2014 | Militano | H04W 36/0055 455/436 |
| 2014/0370885 A1* | 12/2014 | Chou | H04B 7/0469 455/423 |
| 2015/0148050 A1* | 5/2015 | Siomina | H04J 11/005 455/452.1 |
| 2016/0014592 A1* | 1/2016 | Park | H04W 36/04 370/331 |

FOREIGN PATENT DOCUMENTS

| | | |
|---|---|---|
| WO | 2013-135269 A1 | 9/2013 |
| WO | 2015/088683 A1 | 6/2015 |

* cited by examiner

ADAPTIVE CELL RANGE EXPANSION MECHANISMS FOR LTE CELLS

TECHNICAL FIELD

Embodiments described herein are generally directed to the field of wireless communications.

BACKGROUND

The current specification for the 3$^{rd}$ Generation Partnership Project (3GPP) and the 3GPP Long Term Evolution (3GPP LTE) provides a Cell Range Expansion (CRE) technique for increasing the time a User Equipment (UE) remains connected to a small cell by decreasing the downlink signal strength constraint associated with cell selection/reselection. The conventional CRE approach promotes offloading of a UE from a macro cell to a small cell, thereby saving macro cell bandwidth and potentially providing better throughput and power performance for the UE. Nevertheless, the conventional CRE approach does not account for factors such as the speed of a UE and/or the balance of downlink/uplink traffic being experienced by the UE. Consequently, the conventional CRE approach can cause situations in which an ongoing data and/or voice session can be interrupted and/or in which macro-cell/small-cell system performance is not optimized.

BRIEF DESCRIPTION OF THE DRAWINGS

Embodiments disclosed herein are illustrated by way of example, and not by way of limitation, in the figures of the accompanying drawings in which like reference numerals refer to similar elements and in which.

It will be appreciated that for simplicity and/or clarity of illustration, elements depicted in the figures have not necessarily been drawn to scale. For example, the dimensions of some of the elements may be exaggerated relative to other elements for clarity. The scaling of the figures does not represent precise dimensions and/or dimensional ratios of the various elements depicted herein. Further, if considered appropriate, reference numerals have been repeated among the figures to indicate corresponding and/or analogous elements.

DESCRIPTION OF THE EMBODIMENTS

Embodiments described herein are generally directed to the field of wireless communications. In the following description, numerous specific details are set forth to provide a thorough understanding of embodiments disclosed herein. One skilled in the relevant art will recognize, however, that the embodiments disclosed herein can be practiced without one or more of the specific details, or with other methods, components, materials, and so forth. In other instances, well-known structures, materials, or operations are not shown or described in detail to avoid obscuring aspects of the specification.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments. As used herein, the terms "User Equipment (UE)," "mobile device," "mobile station (MS)," and "wireless device" are interchangeable.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

The subject matter disclosed herein relates to systems and methods that provide adaptive CRE-based offset parameters that take into account the speed of a UE and that take into account the DL/UL traffic balance being experienced by the UE. If the speed of a UE is greater than a predefined speed, it is preferable for the UE to connect to a macro cell. If the speed of the UE is greater than the predefined speed, the subject matter disclosed herein provides that the UE utilizes an adaptive CRE-based offset parameter that has a low value or is equal to zero. Similarly, if the balance of downlink/uplink traffic being experienced by a UE is mainly downlink traffic, the subject matter disclosed herein provides that the UE utilizes an adaptive CRE-based offset parameter that has a low value or is equal to zero. Consequently, embodiments of the subject matter disclosed herein reduce the handover failure associated with CRE particularly for high speed UEs while also being able to increase system capacity if the balance of the downlink and uplink traffic experienced by the UE is mostly downlink traffic. Moreover, the subject matter disclosed herein relates to techniques that enable an evolved Node B (eNB) to indicate to a UE when to use a no or low-value adaptive CRE-based offset parameters and when to use a default value or higher-value adaptive CRE-based offset parameters.

It is widely expected that the growth in the volume of mobile data traffic cannot be met by existing $3^{rd}$ and $4^{th}$ Generation (3G/4G) network cellular deployments. To address the expected growth in traffic volume, the standards body of the 3GPP is considering dense deployments of small cells of low-power LTE base stations that have a smaller transmission range than the transmission range of traditional macro cells, and that are primarily intended to overlay the existing macro-cell deployment. Various scenarios and network architectures are being considered under a 3GPP Technical Report (TR) 36.932 V12.1.0 study item (SI) "Study on small cell enhancements for E-UTRA and E-UTRAN—Higher-layer aspects."

A Cell Range Expansion (CRE) approach has been proposed for increasing the time a User Equipment (UE) remains connected to a small cell by decreasing the downlink signal strength constraint associated with cell selection/reselection. Connectivity of a UE to an evolved Node B (eNB) (regardless whether the eNB is part of a macro cell or a small cell) is based on the downlink signal strength received from an eNB. The CRE approach involves a UE using a lower threshold value by some pre-determined offset (i.e., a CRE-Offset) to evaluate the received signal strength of the downlink signal of a small-cell eNB. In effect, the CRE approach effectively increases the size, or range, of a coverage region of a small cell and thereby tends to increase the likelihood that the UE will connect to the small cell. The conventional CRE offset values are fixed, and are determined based on the density of small cells overlapping macro cells and the loading experienced by the macro cells.

Figure 1:
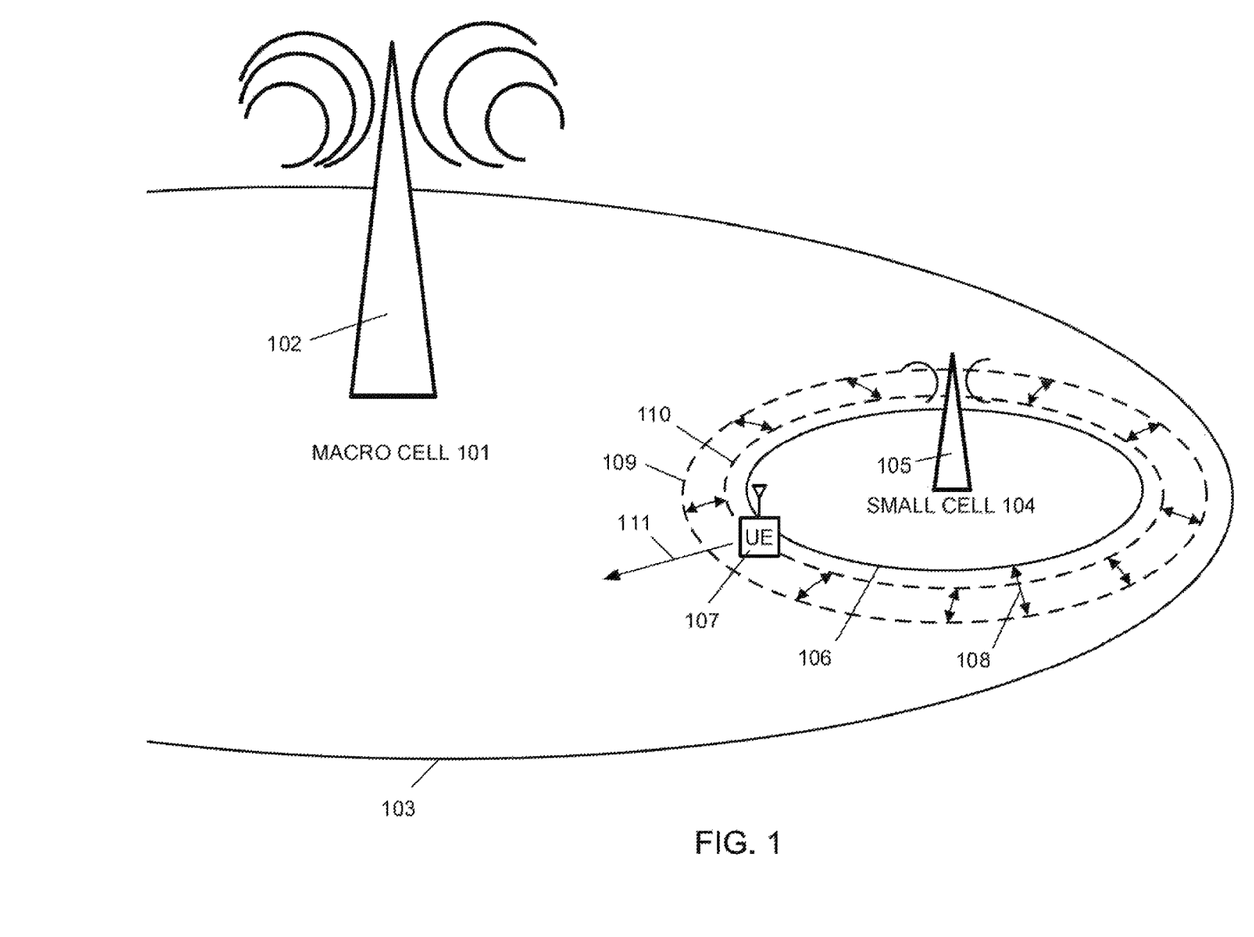
FIG. 1 depicts how a Cell Range Expansion (CRE) approach effectively expands of the coverage size of a small cell.

FIG. 1 depicts a Cell Range Expansion (CRE) technique that utilizes adaptive CRE-based offset parameters that take into account the speed of a UE and that take into account the DL/UL traffic balance being experienced by the UE according to the subject matter disclosed herein. In FIG. 1, a macro cell 101 includes an eNB 102 that provides a coverage region 103, of which only a portion of coverage region 103 is depicted. A small cell 104 is located within coverage region 103. Small cell 104 includes an eNB 105 that provides a coverage region 106 that overlaps with coverage region 103. Solid lines are used to depict the edges of coverage regions 103 and 106. If a UE 107 uses no adaptive CRE-Offset parameters (i.e., CRE-Offset=0) for evaluating the relative strengths of the download signals from macro cell 101 and small cell 104, coverage region 106 represents the non-expanded coverage region of small cell 104. If UE 107 uses the adaptive CRE-Offset parameters disclosed therein, the coverage region for small cell 104 effectively becomes larger, as depicted by CRE extended-coverage region 108. Depending on the values selected for the adaptive CRE-Offset parameters disclosed therein CRE extended-coverage range 108 may vary between edges 109 and 110. The dashed lines are used to depict the variable edges of extended-coverage region 108.

A conventional fixed CRE-offset, however, may not be optimum in some instances. For example, if the speed of UE 107 is relatively high, it may not be desirable for UE 107 to stay connected to a small cell 104 while UE 107 is in small-cell CRE extended-coverage region 108 because the chance of handover failure is increased, particularly if UE 107 is moving in a direction 111 that is away from the small cell. In such a situation, if UE 107 starts a handover process in the CRE extended-coverage region and crosses the coverage-region boundary before the handover process completes, an ongoing data and/or voice session can become interrupted resulting in a degraded user experience.

Another instance in which a conventional fixed CRE-offset may not be optimum is if UE 107 is experiencing mainly, or mostly, downlink traffic. Generally, downlink system capacity can be improved if UE 107 is experiencing mainly downlink traffic by connecting to a macro cell even though UE 107 is within a CRE extended coverage region 108. Nevertheless, if a UE that is experiencing mostly downlink traffic is connected to a small cell, and the performance of a downlink signal associated with a macro cell has better performance that the downlink performance of the small cell, then the performance of the UE may be far better in uplink due to its proximity to the small cell than its performance in the downlink, and a downlink/uplink (DL/UL) imbalance situation can occur.

According to Section 5.2.3 Cell Selection Process of the 3GPP TS 3GPP TS 36.304 version 11.3.0 Release 11, LTE; Evolved Universal Terrestrial Radio Access (E-UTRA); User Equipment (EU) procedures in idle mode (Release 11), a cell is conventionally selected only if the cell selection criterion S (S criterion) is fulfilled, which is $$\text{Srxlev} > 0 \text{ AND } \text{Squal} > 0 \tag{1}$$

in which $$\text{Srxlev} = Q_{rxlevmeas} - (Q_{rxlevmin} + Q_{rxlevminoffset}) - P\text{compensation} \tag{2}$$

and $$\text{Squal} = Q_{qualmeas} - (Q_{qualmin} + Q_{qualminoffset}), \tag{3}$$

and in which,

Srxlev is the Cell selection RX level value (dB);
Squal is the Cell selection quality value (dB);
$Q_{rxlevmeas}$ is the measured cell RX level value (RSRP);
$Q_{qualmeas}$ is the measured cell quality value (RSRQ);
$Q_{rxlevmin}$ is the minimum required RX level in the cell (dBm);
$Q_{qualmin}$ is the minimum required quality level in the cell (dB);
$Q_{rxlevminoffset}$ is the offset to the signalled Qrxlevmin taken into account in the Srxlev evaluation as a result of a periodic search for a higher priority Public Land Mobile Network (PLMN) while camped normally in a Visited Public Land Mobile Network (VPLMN) (see 3GPP TS 36.331, "Radio Resource Control (RRC); Protocol specification," V11.4.0, June 2013);
$Q_{qualminoffset}$ is the offset to the signalled $Q_{qualmin}$ taken into account in the Squal evaluation as a result of a periodic search for a higher priority PLMN while camped normally in a VPLMN (see 3GPP TS 36.331, "Radio Resource Control (RRC); Protocol specification," V11.4.0, June 2013);
Pcompensation is the max(PEMAX-$P_{PowerClass}$, 0) (dB);
PEMAX is the maximum TX power level an UE may use when transmitting on the uplink in the cell (dBm) defined as PEMAX in 3GPP TS 36.101 V12.1.0 (2013-9), Technical Specification Group Radio Access Network; Evolved Universal Terrestrial Radio Access (E-UTRAN);
User Equipment (EU) radio transmission and reception (Release 12); and
$P_{PowerClass}$ is the maximum RF output power of the UE (dBm) according to the UE power class as defined in 3GPP TS 36.101 V12.1.0 (2013-9), Technical Specification Group Radio Access Network; Evolved Universal Terrestrial Radio Access (E-UTRAN); User Equipment (EU) radio transmission and reception (Release 12).

Offsets values for parameters Qrxlevminoffset and Qqualminoffset, which are signaled to a UE, are only applied by a UE if a cell is evaluated for cell selection as a result of a periodic search for a higher priority Public Land Mobile Network (PLMN) while the UE is camped normally in a Visited Public Land Mobile Network (VPLMN). If a high-priority cell is found that satisfy the cell selection criterion S, the higher-priority cell is selected. Otherwise for conventional intra-frequency and equal priority inter-frequency cell reselection, a UE performs ranking of all cells that fulfills the cell selection criterion S and selects the best cell.

The conventional cell-ranking criteria $R_s$ for a serving cell and $R_n$ for neighboring cells for intra-frequency and equal priority inter-frequency cell reselection are defined in 3GPP TS 36.304 version 11.3.0 Release 11, LTE; Evolved Universal Terrestrial Radio Access (E-UTRA); User Equipment (EU) procedures in idle mode (Release 11) as:

$$R_s = Q_{meas,s} + Q_{Hyst} \quad (4)$$

and $$R_n = Q_{meas,n} - Q\text{offset} \quad (5)$$

in which,
the subscript s indicates a serving cell;
the subscript n indicates a neighboring cell;
Qmeas is the RSRP measurement quantity used in cell reselections;
$Q_{Hyst}$ specifies the hysteresis value for ranking criteria; and
Qoffset for intra-frequency such that Qoffset equals Qoffset$_{s,n}$, if Qoffset$_{s,n}$ is valid, otherwise Qoffset equals to zero, and for inter-frequency: Qoffset equals Qoffset$_{s,n}$ plus Qoffsetfrequency, if Qoffset$_{s,n}$ is valid, otherwise Qoffset equals to $Q_{offsetfrequency}$.

According to the subject matter disclosed herein, two CRE-based offset parameters are introduced into Eq. 1 that adaptively extend the coverage range of small cell in a manner that takes into account the speed of a UE and the DL/UL traffic balance being experienced by the UE. In particular, an adaptive CRE-based offset parameter Q$rxcreoffset$ for Received Signal Received Power (RSRP) and an adaptive CRE-based offset parameter $Q_{qualcreoffset}$ for Received Signal Received Quality (RSRQ) are respectively introduced into Eqs. (2) and (3) for the S-criteria for cell selection/reselection. Thus, the cell selection S criterion according to the subject matter disclosed herein is based on Eqs. (6) and (7) below:

$$\text{Srxlev} = Q_{rxlevmeas} - (Q_{rxlevmin} + Q_{rxlevminoffset} + Q_{rxcreoffset}) - P\text{compensation} \quad (6)$$

$$\text{Squal} = Q_{qualmeas} - (Q_{qualmin} + Q_{qualminoffset} + Q_{qualcreoffset}) \quad (7)$$

CRE-based offset parameters $Q_{rxcreoffset}$ and $Q_{qualcreoffset}$ help a small cell to be qualified for cell selection/reselection at a correspondingly lower downlink signal strength and quality, while accounting for the speed of a UE.

For cell ranking, the subject matter disclosed herein similarly introduces CRE-based adaptive offset parameters $Q_{cre,s}$ and $Q_{cre,n}$ into Eqs. (4) and (5) in order to form Eqs. (8) and (9) below:

$$R_s = Q_{meas,s} + Q_{Hyst} + Q_{cre,s} \quad (8)$$

$$R_n = Q_{meas,n} - Q\text{offset} + Q_{cre,n} \quad (9)$$

According to the subject matter disclosed herein, the value of adaptive offset parameter $Q_{rxcreoffset}$ for RSRP and the value of adaptive offset parameter $Q_{qualcreoffset}$ for RSRQ for a small cell should be greater than 0 for situations in which a UE is in a macro cell to increase the likelihood that the UE connects to a small cell. In a situation in which a UE is already in a small cell, adaptive parameters $Q_{rxcreoffset}$ and $Q_{qualcreoffset}$ should both be greater than or equal to zero so that the UE will continue to select the small cell even for a lower received signal quality.

In one exemplary embodiment, adaptive parameters $Q_{rxcreoffset}$ and $Q_{qualcreoffset}$ can be respectively incorporated in to conventional offset parameters $Q_{rxlevminoffset}$ and $Q_{qualminoffset}$ for higher-priority cells.

Adaptive offset parameter $Q_{cre,s}$ should be greater than zero in a situation in which a UE is in a macro cell if the serving cell is a small cell, and equal to zero or nearly zero if the serving cell is a macro cell. Adaptive parameter $Q_{cre,n}$ should be greater than zero if a neighbor cell is a small cell, and should be less than or equal to zero if the neighbor cell is a macro cell. In one exemplary embodiment, adaptive parameters $Q_{cre,s}$ and $Q_{cre,n}$ can be respectively incorporated into $Q_{Hyst}$ and Qoffset.

In one exemplary embodiment, the adaptive offset parameters disclosed herein are transmitted from an eNB to a UE in a System Information Block Type 4 (SIB4) Information Element (IE) and/or a System Information Block Type 5 (SIB5) IE.

An IE SIB4 contains information related to a neighboring cell that is relevant only for intra-frequency cell re-selection, and includes information related to cells having specific reselection parameters as well as blacklisted cells. According to the subject matter disclosed herein, a conventional SIB4 can be modified to include information relating to adaptive offset parameters $Q_{rxereoffset}$ and $Q_{qualcreoffset}$ as shown in bold in the exemplary pseudo code below. The parameters $Q_{cre,s}$ and $Q_{cre,n}$ appearing in Eqs. (8) and (9) are referred to as the parameter q-CreOffsetCell in exemplary SIB4 message below. The parameter $Q_{cre,s}$ refers to the parameter for a serving cell (hence the subscript "s") and the parameter $Q_{cre,n}$ refers to the parameter for a neighboring cell (hence the subscript "n").

Exemplary SystemInformationBlockType4 Information Element

```
-- ASN1START
SystemInformationBlockType4 ::=    SEQUENCE {
    intraFreqNeighCellList         IntraFreqNeighCellList          OPTIONAL,    -- Need OR
    intraFreqBlackCellList         IntraFreqBlackCellList          OPTIONAL,    -- Need
OR
    csg-PhysCellIdRange            PhysCellIdRange                 OPTIONAL,    -- Cond CSG
    ...,
    lateNonCriticalExtension       OCTET STRING                    OPTIONAL     -- Need
OP
}
IntraFreqNeighCellList ::=    SEQUENCE (SIZE (1..maxCellIntra)) OF IntraFreqNeighCellInfo
IntraFreqNeighCellInfo ::=    SEQUENCE {
    physCellId                     PhysCellId,
    q-OffsetCell                   Q-OffsetRange,
    q-RxCreOffset                  Q-RxCreOffsetRange              OPTIONAL,    -- Need ON
```

Exemplary SystemInformationBlockType4 Information Element -continued

| | | | |
|---|---|---|---|
| q-QualCreOffset | Q-QualCreOffsetRange | OPTIONAL, | -- Need ON |
| q-CreOffsetCell | Q-CreOffsetRange | OPTIONAL, | -- Need ON |
| ... | | | |
| } | | | |

```
IntraFreqBlackCellList ::=SEQUENCE (SIZE (1..maxCellBlack)) OF PhysCellIdRange
-- ASN1STOP
```

An IE SIB5 contains information that is relevant only for interfrequency cell re-selection, i.e., information about other E-UTRA frequencies and interfrequency neighboring cells that are relevant for cell re-selection, and includes cell reselection parameters that are common for a frequency as well as cell specific re-selection parameters. According to the subject matter disclosed herein, a conventional SIB5 can be modified to include information relating to adaptive offset parameters $Q_{rxcreoffset}$ and $Q_{qualcreoffset}$, as shown in bold in the exemplary pseudo code below. The parameters $Q_{cre,s}$ and $Q_{cre,n}$ appearing in Eqs. (8) and (9) are referred to as the parameter q-CreOffsetCell in the exemplary SIB5 message below. The parameter $Q_{cre,s}$ refers to the parameter for a serving cell (hence the subscript "s") and the parameter $Q_{cre,n}$ refers to the parameter for a neighboring cell (hence the subscript "n").

Exemplary SystemInformationBlockType5 information element

```
-- ASN1START
System.InformationBlockType5 ::=     SEQUENCE {
    interFreqCarrierFreqList             InterFreqCarrierFreqList,
    ...,
    lateNonCriticalExtension             OCTET STRING      (CONTAINING
SystemInformationBlockType5-v8h0-IEs)       OPTIONAL  -- Need OP
}
.
.
.
InterFreqCarrierFreqList ::=     SEQUENCE (SIZE (1..maxFreq)) OF InterFreqCarrierFreqInfo
InterFreqCarrierFreqInfo ::=     SEQUENCE {
    dl-CarrierFreq                       ARFCN-ValueEUTRA,
    q-RxLevMin                           Q-RxLevMin,
    p-Max                                P-Max                 OPTIONAL,     -- Need
OP
    t-ReselectionEUTRA                   T-Reselection,
    t-ReselectionEUTRA-SF                SpeedStateScaleFactors  OPTIONAL,   -- Need
OP
    threshX-High                         ReselectionThreshold,
    threshX-Low                          ReselectionThreshold,
    allowedMeasBandwidth                 AllowedMeasBandwidth,
    presenceAntennaPort1                 PresenceAntennaPort1,
    cellReselectionPriority              CellReselectionPriority  OPTIONAL,  -- Need
OP
    neighCellConfig                      NeighCellConfig,
    q-OffsetFreq                         Q-OffsetRange         DEFAULT dB0,
    interFreqNeighCellList               InterFreqNeighCellList  OPTIONAL,   -- Need
OR
    interFreqBlackCellList               InterFreqBlackCellList  OPTIONAL,   -- Need
OR
    ...,
    [[ q-QualMin-r9                      Q-QualMin-r9            OPTIONAL,   -- Need
OP
       threshX-Q-r9                      SEQUENCE {
           threshX-HighQ-r9                  ReselectionThresholdQ-r9,
           threshX-LowQ-r9                   ReselectionThresholdQ-r9
       }                                                         OPTIONAL    -- Cond
RSRQ
    ]],
    [[ q-QualMinWB-r11                   Q-QualMin-r9            OPTIONAL    -- Cond WB
RSRQ
    ]]
}
.
.
.
InterFreqNeighCellList ::=       SEQUENCE (SIZE (1..maxCellInter)) OF InterFreqNeighCellInfo
InterFreqNeighCellInfo ::=       SEQUENCE {
    physCellId                           PhysCellId,
    q-OffsetCell                         Q-OffsetRange,
    q-RxCreOffset                        Q-RxCreOffsetRange     OPTIONAL,    -- Need ON
    q-QualCreOffset                      Q-QualCreOffsetRange   OPTIONAL,    -- Need ON
    q-CreOffsetCell                      Q-CreOffsetRange       OPTIONAL     -- Need ON
}
```

| Exemplary SystemInformationBlockType5 information element |
| --- |
| InterFreqBlackCellList ::=  SEQUENCE (SIZE (1..maxCellBlack)) OF PhysCellIdRange<br>-- ASN1STOP |

Exemplary values for adaptive offset parameter $Q_{rxcreoffset}$ can range from, but are not limited to, −15 dB to +15 dB. An exemplary information element (IE) that sets the value ranges for $Q_{rxcreoffset}$ can be as follows:

```
-- ASN1START
Q-RxCreOffsetRange ::= INTEGER (-15..15)
-- ASN1STOP
```

Exemplary values for adaptive offset parameter $Q_{qualcreoffset}$ can range from, but are not limited to, −15 dB to +15 dB. An exemplary information element (IE) that sets the value ranges for $Q_{qualcreoffset}$ can be as follows:

```
-- ASN1START
Q-QualCreOffsetRange ::=    INTEGER (-15..15)
-- ASN1STOP
```

Exemplary values for the adaptive offset parameter $Q_{creoffsetrange}$ can range from, but are not limited to, 0 dB to +15 dB. An exemplary information element that sets the value ranges for $Q_{qualcreoffset}$ can be as follows:

```
-- ASN1START
Q-CreOffsetRange ::=  INTEGER 0..15)
-- ASN1STOP
```

Figure 2:
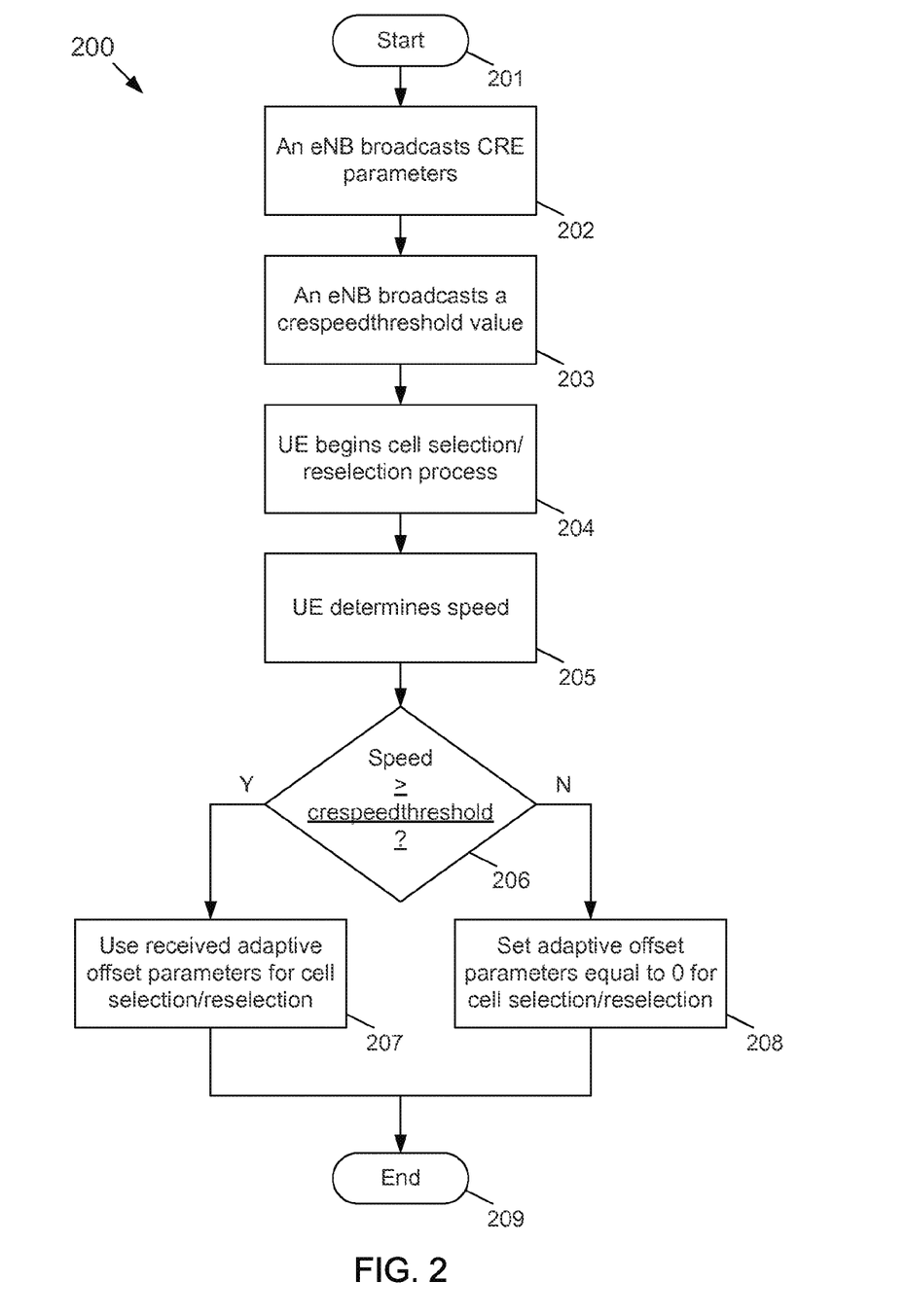
FIG. 2 depicts a flow diagram of an exemplary CRE-based process that accounts for the speed of a UE according to the subject matter disclosed herein.

FIG. 2 depicts a flow diagram of an exemplary CRE-based process 200 that accounts for the speed of a UE according to the subject matter disclosed herein. The process starts at 201. At 202, an eNB broadcasts the CRE parameters (including information relating to adaptive offset parameters $Q_{rxcreoffset}$, $Q_{qualcreoffset}$, $Q_{cre,s}$ and $Q_{cre,n}$ and their corresponding range information) using, for example, an SIB4 IE and/or an SIB5 IE, which is received by a UE. At 203, an eNB broadcasts a crespeedthreshold value in, for example, an IE such as a SystemInformationBlockType3 (SIB3) IE, which is received by the UE. An SIB3 IE includes cell re-selection information common for intrafrequency, interfrequency and/or inter-RAT (Radio Access Technology) cell re-selection (i.e., applicable for more than one type of cell re-selection, but not necessarily all) as well as intra-frequency cell re-selection information other than neighboring cell related. According to the subject matter disclosed herein, a conventional SIB3 can be modified to include information relating to the crespeedthreshold parameter, as shown in bold in the exemplary pseudo code below.

| Exemplary SystemInformationBlockType3 information element |
| --- |
| ```
-- ASN1START
SystemInformationBlockType3 ::=         SEQUENCE {
    cellReselectionInfoCommon               SEQUENCE {
        q-Hyst                                  ENUMERATED {
                                                    dB0, dB1, dB2, dB3, dB4, dB5, dB6, dB8, dB10,
                                                    dB12, dB14, dB16, dB18, dB20, dB22, dB24},
        speedStateReselectionPars               SEQUENCE {
            mobilityStateParameters                 MobilityStateParameters,
            q-HystSF                                SEQUENCE {
                sf-Medium                               ENUMERATED {
                                                            dB-6, dB-4, dB-2, dB0},
                sf-High                                 ENUMERATED {
                                                            dB-6, dB-4, dB-2, dB0}
                                                                                    OPTIONAL    -- Need
            }
        }                                                                           OP
    },
    cellReselectionServingFreqInfo          SEQUENCE {
        s-NonIntraSearch                        ReselectionThreshold                OPTIONAL,   -- Need
                                                                                    OP
        threshServingLow                        ReselectionThreshold,
        cellReselectionPriority                 CellReselectionPriority
    },
    intraFreqCellReselectionInfo            SEQUENCE {
        q-RxLevMin                              Q-RxLevMin,
        p-Max                                   P-Max,                              OPTIONAL,   -- Need
                                                                                    OP
        s-IntraSearch                           ReselectionThreshold                OPTIONAL,   -- Need
                                                                                    OP
        allowedMeasBandwidth                    AllowedMeasBandwidth                OPTIONAL,   -- Need
                                                                                    OP
        presenceAntennaPort1                    PresenceAntennaPort1,
        neighCellConfig                         NeighCellConfig,
        t-ReselectionEUTRA                      T-Reselection,
        t-ReselectionEUTRA-SF                   SpeedStateScaleFactors              OPTIONAL    -- Need
                                                                                    OP
    },
    ...,
    lateNonCriticalExtension                OCTET STRING                            OPTIONAL,   -- Need OP
    [[ s-IntraSearch-v920                    SEQUENCE {
``` |

-continued

| Exemplary SystemInformationBlockType3 information element | | | |
|---|---|---|---|
| s-IntraSearchP-r9 | ReselectionThreshold, | | |
| s-IntraSearchQ-r9 | ReselectionThresholdQ-r9 | | |
| } | | OPTIONAL, | -- Need |
| OP | | | |
| s-NonIntraSearch-v920 | SEQUENCE { | | |
| s-NonIntraSearchP-r9 | ReselectionThreshold, | | |
| s-NonIntraSearchQ-r9 | ReselectionThresholdQ-r9 | | |
| } | | OPTIONAL, | -- Need |
| OP | | | |
| q-QualMin-r9 | Q-QualMin-r9 | OPTIONAL, | -- Need |
| OP | | | |
| threshServingLowQ-r9 | ReselectionThresholdQ-r9 | OPTIONAL | -- Need |
| OP | | | |
| ]], | | | |
| [[ q-QualMinWB-r11 | Q-QualMin-r9 | OPTIONAL | -- Cond WB RSRQ |
| ]], | | | |
| [[ crespeedthreshold-rlx ON | crespeedthreshold-rlx | OPTIONAL | -- Need |
| ]] | | | |
| } | | | |
| -- ASN1STOP | | | |

At 204 in FIG. 2, the UE enters a cell selection/reselection process. At 205, the UE determines (or estimates) its speed by using, for example, a Mobility State Estimate (MSE), in which the number of cell changes within a given time period (TcrMax) are determined. The mobility state can be normal if the number of cell changes is less than a predefined value NCR_M, medium if the number of cell changes is greater than NCR_M or less than a predefined value NCR_H, or high if the number of cell changes greater than NCR_H. It should be understood that other well-known techniques can be used for determining the speed of the UE. Flow continues to 206, where the UE determines whether its determined speed is greater than or equal to crespeedthreshold. It should be understood that in an alternative embodiment, the comparison of block 206 could be that the UE determines whether its determined speed is greater than crespeedthreshold. If, at 206, the speed of the UE is greater than or equal to crespeedthreshold, flow continues to 206 where the UE uses the adaptive offset parameters received at block 202 and uses Eqs. (6)-(9) for cell selection/reselection. Flow continues to 209 where the process ends.

If, at 206, the speed of the UE is less than crespeedthreshold, flow continues to 208 where the UE sets the adaptive offset parameters received at block 202 equal to zero or nearly zero and uses Eqs. (6)-(9) for cell selection/reselection. Flow continues to 209 where the process ends.

In an alternative exemplary embodiment, more than one set of adaptive offset parameters are used in which each set corresponds to a different range of speeds. A UE then selects the proper set of adaptive offset parameters based on its determined speed. For this alternative exemplary embodiment, multiple sets of adaptive offset parameters are sent in a SIB4 IE and/or a SIB5 IE in a manner similar to that described above.

Figure 3:
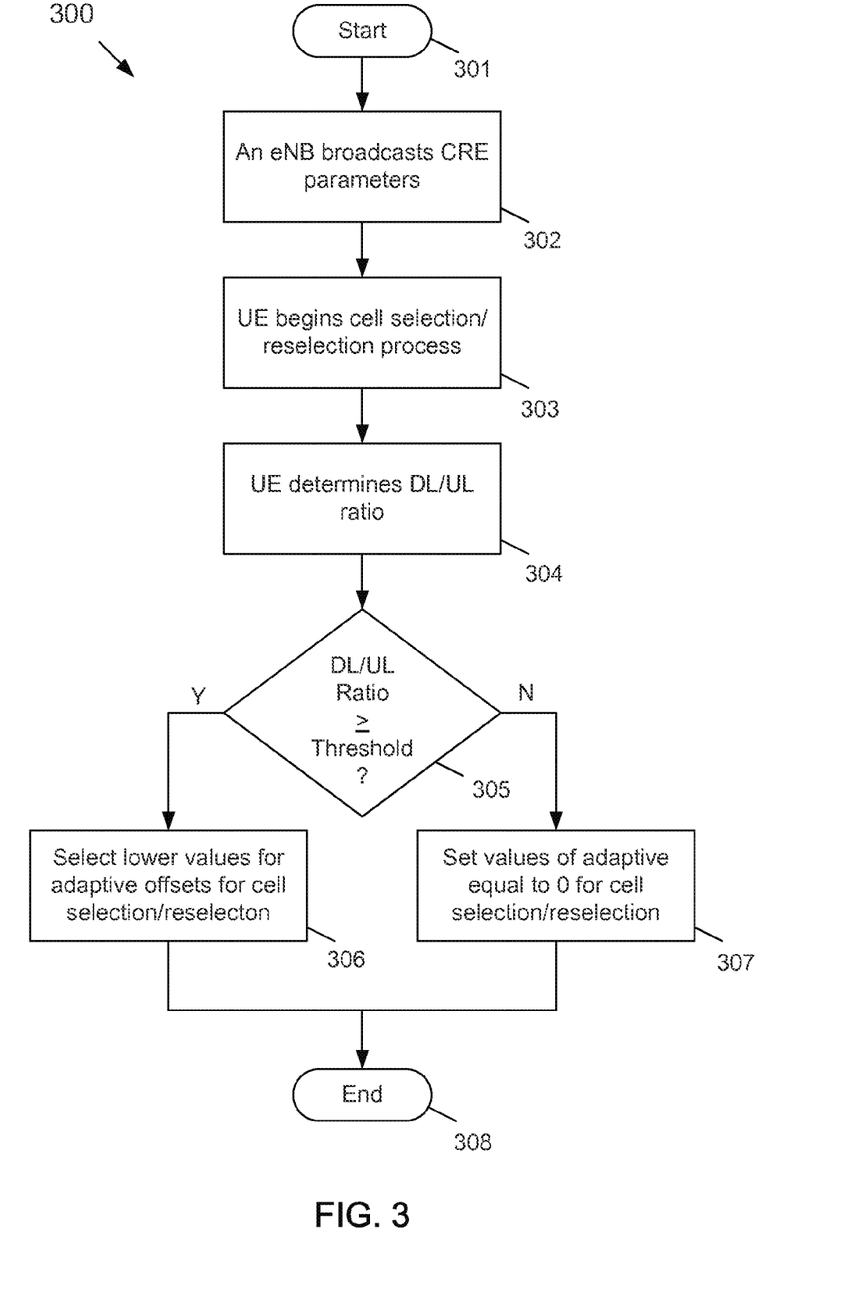
FIG. 3 depicts a flow diagram of an exemplary CRE process that accounts for the downlink/uplink traffic balance experienced by a UE according to the subject matter disclosed herein.

FIG. 3 depicts a flow diagram of an exemplary CRE process 300 that accounts for the downlink/uplink traffic balance experienced by a UE according to the subject matter disclosed herein. The process starts at 301. At 302, an eNB broadcasts the CRE parameters (including information relating to adaptive offset parameters $Q_{rxcreoffset}$, $Q_{qualcreoffset}$, $Q_{cre,s}$ and $Q_{cre,n}$ and their corresponding range information) using, for example, an SIB4 IE and/or an SIB5 IE, which is received by a UE. At 303, the UE enters a cell selection/reselection process. At 304, the UE determines the ratio of the number of downlink packets to the number of uplink packets (e.g., # of DL packets/# of UL packets). In one exemplary embodiment, a UE determines the DL/UL ratio over a time window of a predetermined length of time. At 305, the UE determines whether the determined DL/UL ratio is greater than or equal to a predetermined threshold value, in which the predetermined threshold value can range from, for example, 0.5 to 1.0. It should be understood that in an alternative embodiment, the comparison of block 305 could be the UE determines whether the determined DL/UL ratio is greater than a predetermined threshold value, in which the predetermined threshold value can range from, for example, 0.5 to 1.0. If, at 305, it is determined that the DL/UL ratio is greater than the predetermined threshold value, flow continues to 306 where lower values are selected for the received adaptive offset parameters received at block 302 and Eqs. (6)-(9) are used for cell selection/reselection. Flow continues to 308 where the process ends.

If at 305, it is determined that the DL/UL ratio less than the predetermined threshold value, flow continues to 307 where the adaptive offset parameters received at block 302 are set to be equal to zero or nearly zero and Eqs. (6)-(9) are used for cell selection/reselection. That is, if the traffic is mostly downlink, the UE sets all of the adaptive offset parameters received at block 302 to be zero or nearly zero and Eqs. (6)-(9) are used for cell selection/reselection. Flow continues to 308 where the process ends.

In an alternative exemplary embodiment, more than one set of values for the adaptive offset parameters are used that are specific to different balances of DL/UL traffic. A UE then selects the proper set of values for the adaptive offset parameters based on its determined DL/UL traffic balance. For this alternative exemplary embodiment, multiple sets of values for the adaptive offset parameters are sent in a SIB4 and/or a SIB5 IEs in a manner similar to that described above.

Figure 4:
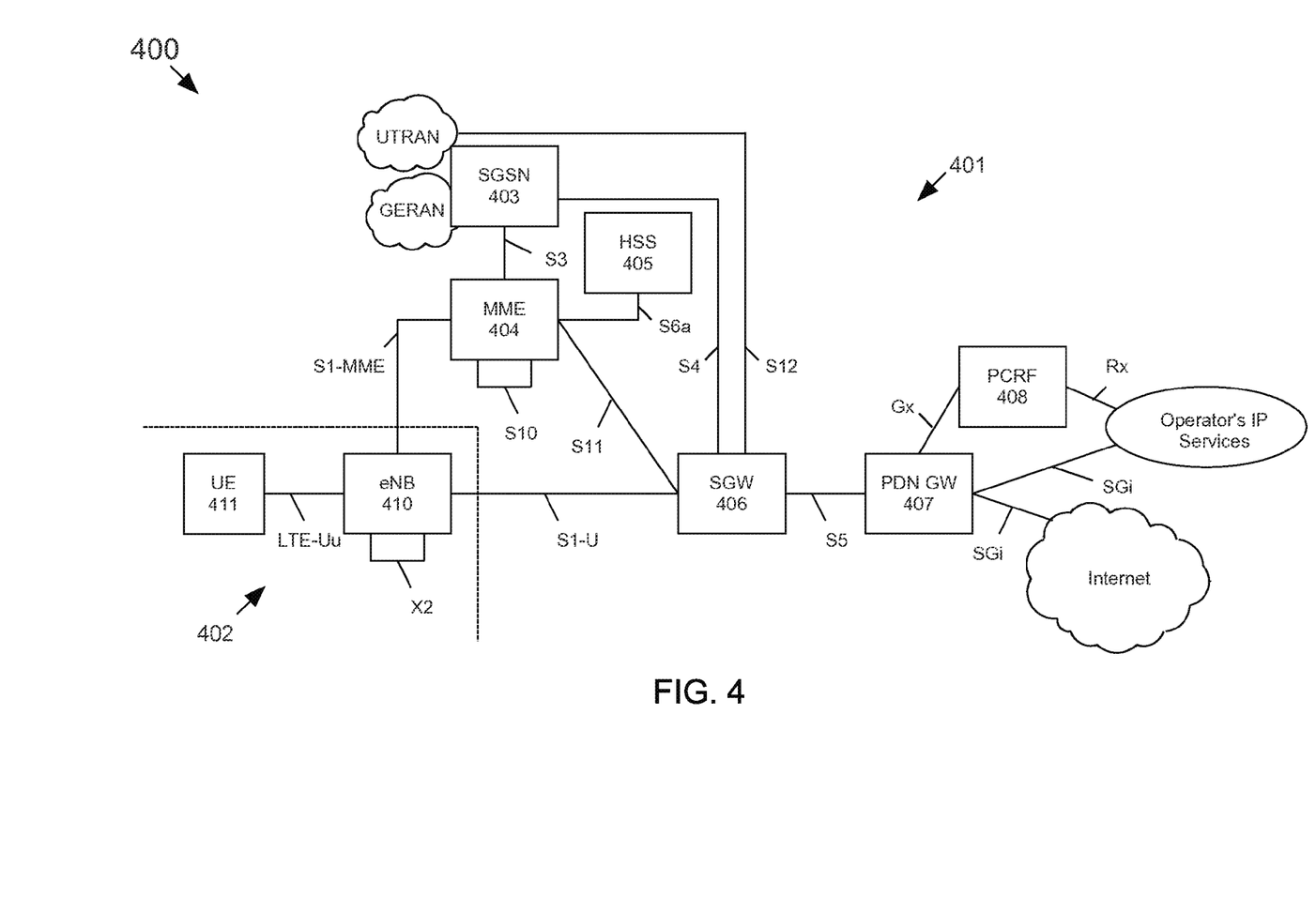
FIG. 4 shows an exemplary block diagram of the overall architecture of a 3GPP LTE network that utilizes any of the techniques disclosed herein relating to adaptive CRE-offset parameters that account for the speed of a UE and/or the DL/UL traffic balance experienced by the UE.

FIG. 4 shows an exemplary block diagram of the overall architecture of a 3GPP LTE network 400 that utilizes any of the techniques disclosed herein relating to adaptive CRE-offset parameters that account for the speed of a UE and/or the DL/UL traffic balance experienced by the UE. FIG. 4 also generally shows exemplary network elements and exemplary standardized interfaces. At a high level, network 400 comprises a core network (CN) 401 (also referred to as an evolved Packet System (EPS)), and an air-interface access network E-UTRAN 402. CN 401 is responsible for the overall control of the various User Equipment (UE) connected to the network and establishment of the bearers. CN 401 may include functional entities, such as a home agent HA and/or an ANDSF server or entity, although not explicitly depicted. E-UTRAN 402 is responsible for all radio-related functions.

The main exemplary logical nodes of CN 401 include, but are not limited to, a Serving GPRS Support Node 403, the Mobility Management Entity 404, a Home Subscriber Server (HSS) 405, a Serving Gate (SGW) 406, a PDN Gateway 407 and a Policy and Charging Rules Function (PCRF) Manager 408. The functionality of each of the network elements of CN 401 is well known and is not described herein. Each of the network elements of CN 401 are interconnected by well-known exemplary standardized interfaces, some of which are indicated in FIG. 4, such as interfaces S3, S4, S5, etc., although not described herein.

While CN 401 includes many logical nodes, the E-UTRAN access network 402 is formed by one node, the evolved NodeB (base station (BS), eNB or eNodeB) 410, which connects to one or more User Equipment (UE) 411, of which only one is depicted in FIG. 4. UE 411 is also referred to herein as a wireless device (WD) and/or a subscriber station (SS), and can include an M2M-type device. In one exemplary configuration, a single cell of an E-UTRAN access network 402 provides one substantially localized geographical transmission point (having multiple antenna devices) that provides access to one or more UEs. In another exemplary configuration, a single cell of an E-UTRAN access network 402 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs, whether part of a macro cell or a small cell, are normally interconnected with each other by an interface known as "X2" and to the EPC by an S1 interface. More specifically, an eNB is connected to MME 404 by an S1-MME interface and to SGW 406 by an S1-U interface. The protocols that run between the eNBs and the UEs are generally referred to as the "AS protocols." Details of the various interfaces are well known and not described herein.

The eNB 410 hosts the PHYsical (PHY), Medium Access Control (MAC), Radio Link Control (RLC), and Packet Data Control Protocol (PDCP) layers, which are not shown in FIG. 4, and which include the functionality of user-plane header-compression and encryption. The eNB 410 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 410 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 411, generates pages for UEs 411 over the air, broadcasts system information, controls UE measurement reporting, such as the periodicity of Channel Quality Information (CQI) reports, and allocates cell-level temporary identifiers to active UEs 411. The RRC layer also executes transfer of UE context from a source eNB to a target eNB during handover, and provides integrity protection for RRC messages. Additionally, the RRC layer is responsible for the setting up and maintenance of radio bearers.

Figure 5:
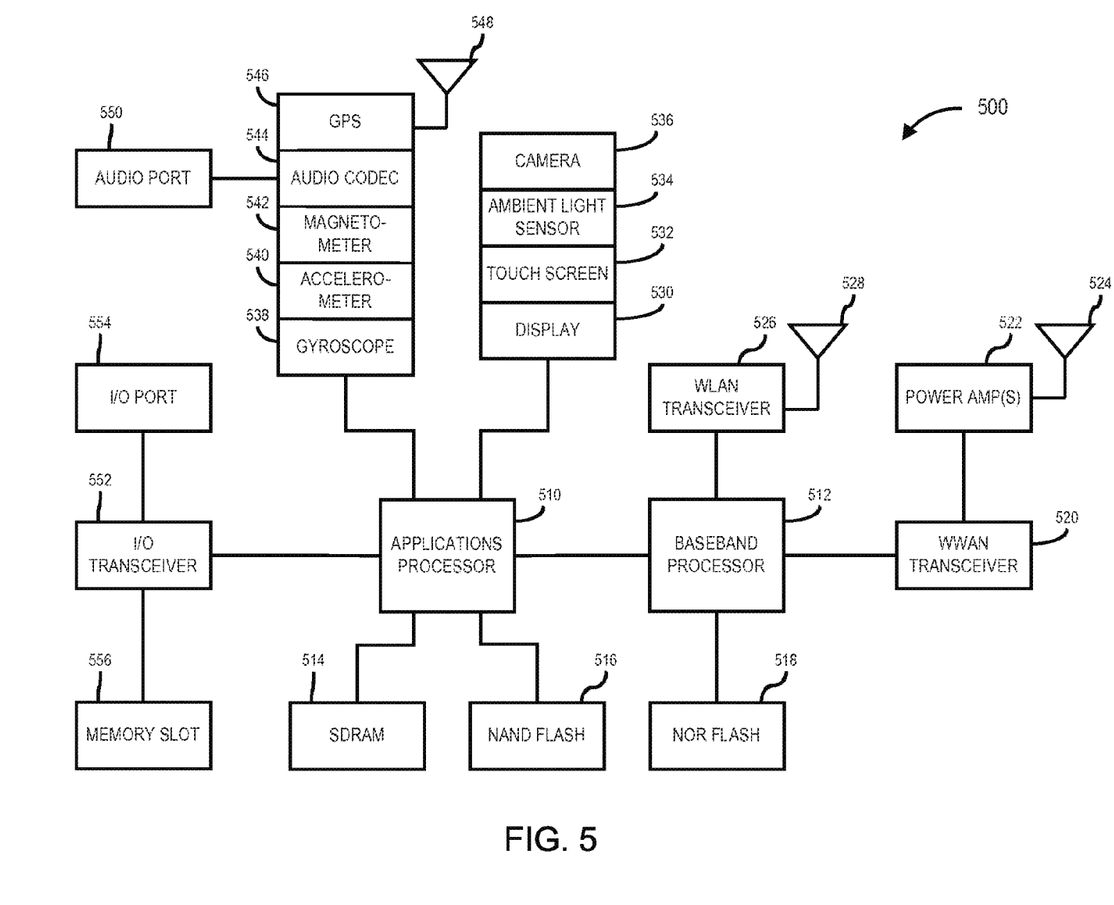
FIG. 5 depicts an exemplary functional block diagram of an information-handling system according to the subject matter disclosed herein.

FIG. 5 depicts an exemplary functional block diagram of an information-handling system 500 according to the subject matter disclosed herein. Information-handling system 500 of FIG. 5 may tangibly embody an information-handling system that utilizes the adaptive CRE-offset parameters that account for the speed of a UE and/or the DL/UL traffic balance experienced by the UE according to the subject matter disclosed herein. In one exemplary embodiment, information-handling system 500 may comprise a mobile-type device or information-handling system capable of wirelessly communicating via a wireless network, such as, but not limited to, a notebook-type computer, a cellular telephone, a personal digital assistant, an M2M-type device, or the like. Although information-handling system 500 represents one example of several types of computing platforms, information-handling system 500 may include more or fewer elements and/or different arrangements of elements than shown in FIG. 5, and the scope of the claimed subject matter is not limited in these respects. Although information-handling system 500 represents one example of several types of computing platforms, such as, but not limited to, eNB 410, and for a terminal device, such as a mobile station (MS), or User Equipment (UE) 411, information-handling system 500 may include more or fewer elements and/or different arrangements of elements than shown in FIG. 5, and the scope of the claimed subject matter is not limited in these respects.

In one or more embodiments, information-handling system 500 may comprise one or more applications processor 510 and a baseband processor 512. Applications processor 510 may be utilized as a general purpose processor to run applications and the various subsystems for information handling system 500, such as, but not limited to, relating to adaptive CRE-offset parameters that account for the speed of a UE and/or the DL/UL traffic balance experienced by the UE according to the subject matter disclosed herein. Applications processor 510 may include a single core or alternatively may include multiple processing cores wherein one or more of the cores may comprise a digital signal processor or digital signal processing core. Furthermore, applications processor 510 may include a graphics processor or coprocessor disposed on the same chip, or alternatively a graphics processor coupled to applications processor 510 may comprise a separate, discrete graphics chip. Applications processor 510 may include on-board memory, such as cache memory, and further may be coupled to external memory devices such as synchronous dynamic random access memory (SDRAM) 514 for storing and/or executing applications, such as, but not limited to, relating to adaptive CRE-offset parameters that account for the speed of a UE and/or the DL/UL traffic balance experienced by the UE according to the subject matter disclosed herein. During operation, and NAND flash 516 for storing applications and/or data even when information handling system 500 is powered off.

In one exemplary embodiment, a list of candidate nodes may be stored in SDRAM 514 and/or NAND flash 516. Further, applications processor 510 may execute computer-readable instructions stored in SDRAM 514 and/or NAND flash 516 that when executed result in, but not limited to, relating to adaptive CRE-offset parameters that account for the speed of a UE and/or the DL/UL traffic balance experienced by the UE according to the subject matter disclosed herein.

In one exemplary embodiment, baseband processor 512 may control the broadband radio functions for information-handling system 500. Baseband processor 512 may store code for controlling such broadband radio functions in a NOR flash 518. Baseband processor 512 controls a wireless wide area network (WWAN) transceiver 520 which is used for modulating and/or demodulating broadband network signals, for example, for communicating via an IEEE 802.11ac network, a 3GPP LTE network and/a 4GPP LTE network or the like as discussed herein with respect to FIG. 5. The WWAN transceiver 520 couples to one or more power amplifiers 522 that are respectively coupled to one or more antennas 524 for sending and receiving radio-frequency signals via the WWAN broadband network. The baseband processor 512 also may control a wireless local area network (WLAN) transceiver 526 coupled to one or more suitable antennas 528 and that may be capable of communicating via a Bluetooth-based standard, an IEEE 802.11-based standard, an IEEE 802.16-based standard, an IEEE 802.18-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a 3GPP-LTE-Advanced-based wireless network, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, a ZigBee-based network, or the like. It should be noted that these are merely exemplary implementations for applications processor 510 and baseband processor 512, and the scope of the claimed subject matter is not limited in these respects. For example, any one or more of SDRAM 514, NAND flash 516 and/or NOR flash 518 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 510 may drive a display 530 for displaying various information or data, and may further receive touch input from a user via a touch screen 532, for example, via a finger or a stylus. In one exemplary embodiment, screen 532 display a menu and/or options to a user that are selectable via a finger and/or a stylus for entering information into information-handling system 500.

An ambient light sensor 534 may be utilized to detect an amount of ambient light in which information-handling system 500 is operating, for example, to control a brightness or contrast value for display 530 as a function of the intensity of ambient light detected by ambient light sensor 534. One or more cameras 536 may be utilized to capture images that are processed by applications processor 510 and/or at least temporarily stored in NAND flash 516. Furthermore, applications processor may be coupled to a gyroscope 538, accelerometer 540, magnetometer 542, audio coder/decoder (CODEC) 544, and/or global positioning system (GPS) controller 546 coupled to an appropriate GPS antenna 548, for detection of various environmental properties including location, movement, and/or orientation of information-handling system 500. Alternatively, controller 546 may comprise a Global Navigation Satellite System (GNSS) controller. Audio CODEC 544 may be coupled to one or more audio ports 550 to provide microphone input and speaker outputs either via internal devices and/or via external devices coupled to information-handling system 500 via the audio ports 550, for example, via a headphone and microphone jack. In addition, applications processor 510 may couple to one or more input/output (I/O) transceivers 552 to couple to one or more I/O ports 554 such as a universal serial bus (USB) port, a high-definition multimedia interface (HDMI) port, a serial port, and so on. Furthermore, one or more of the I/O transceivers 552 may couple to one or more memory slots 556 for optional removable memory, such as secure digital (SD) card or a subscriber identity module (SIM) card, although the scope of the claimed subject matter is not limited in these respects.

Figure 6:
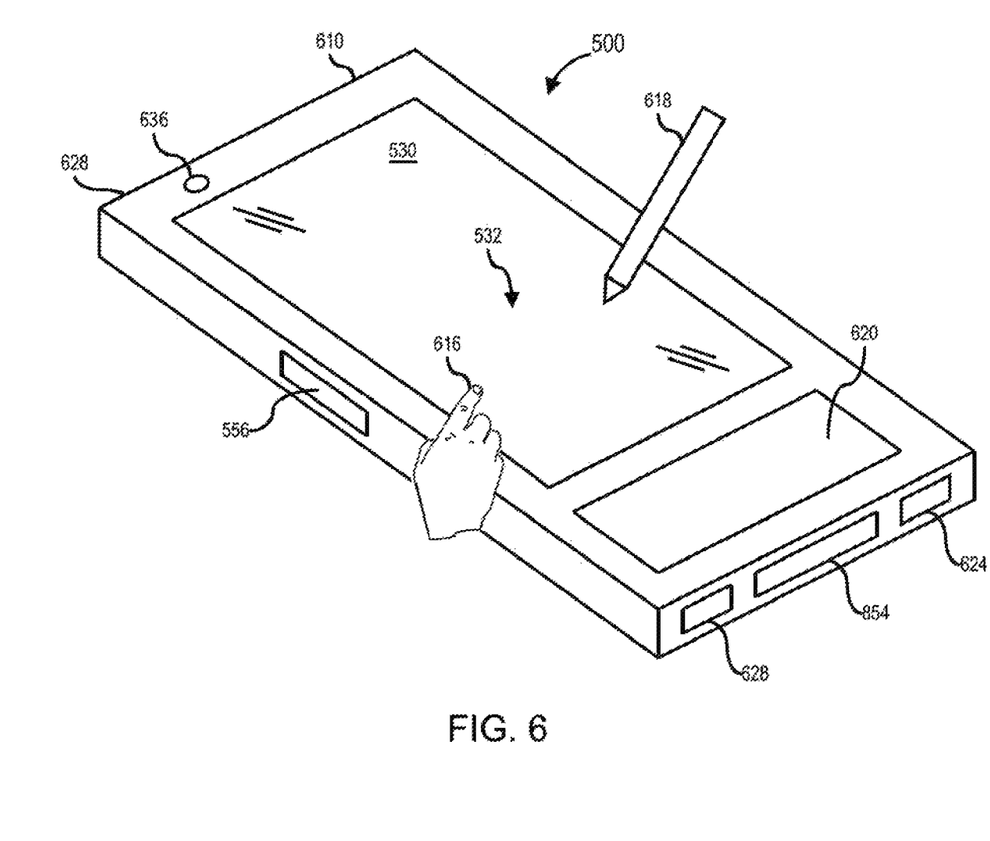
FIG. 6 depicts an isometric view of an exemplary embodiment of the information-handling system of FIG. 5 that optionally may include a touch screen in accordance with one or more embodiments disclosed herein.

FIG. 6 depicts an isometric view of an exemplary embodiment of the information-handling system of FIG. 5 that optionally may include a touch screen in accordance with one or more embodiments disclosed herein. FIG. 6 shows an example implementation of information-handling system 500 of FIG. 5 tangibly embodied as a cellular telephone, smartphone, smart-type device, or tablet-type device or the like, that may utilize the adaptive CRE-offset parameters that account for the speed of a UE and/or the DL/UL traffic balance experienced by the UE according to the subject matter disclosed herein. The information-handling system 500 may comprise a housing 610 having a display 530 that may include a touch screen 532 for receiving tactile input control and commands via a finger 616 of a user and/or a via stylus 618 to control one or more applications processors 810. The housing 610 may house one or more components of information-handling system 500, for example, one or more applications processors 510, one or more of SDRAM 514, NAND flash 516, NOR flash 518, baseband processor 512, and/or WWAN transceiver 520. The information-handling system 500 further may optionally include a physical actuator area 620 that may comprise a keyboard or buttons for controlling information-handling system 500 via one or more buttons or switches. The information-handling system 500 may also include a memory port or slot 556 for receiving non-volatile memory, such as flash memory, for example, in the form of a secure digital (SD) card or a subscriber identity module (SIM) card. Optionally, the information-handling system 500 may further include one or more speakers and/or microphones 624 and a connection port 554 for connecting the information-handling system 500 to another electronic device, dock, display, battery charger, and so on. Additionally, information-handling system 500 may include a headphone or speaker jack 628 and one or more cameras 536 on one or more sides of the housing 610. It should be noted that the information-handling system 500 of FIGS. 5 and 6 may include more or fewer elements than shown, in various arrangements, and the scope of the claimed subject matter is not limited in this respect.

Figure 7:
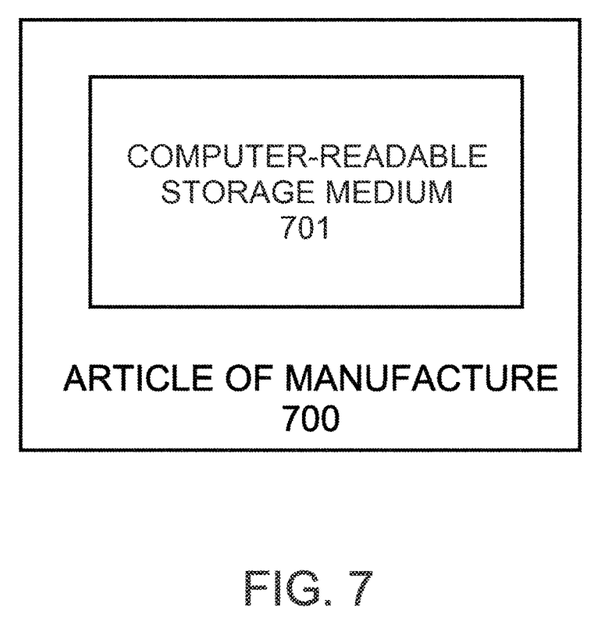
FIG. 7 depicts an exemplary embodiment of an article of manufacture comprising a non-transitory computer-readable storage medium having stored thereon computer-readable instructions that, when executed by a computer-type device, results in any of the various techniques and methods according to the subject matter disclosed herein.

FIG. 7 depicts an exemplary embodiment of an article of manufacture 700 comprising a non-transitory computer-readable storage medium 701 having stored thereon computer-readable instructions that, when executed by a computer-type device, results in any of the various techniques and methods according to the subject matter disclosed herein. Exemplary computer-readable storage mediums that could be used for computer-readable storage medium 701 could be, but are not limited to, a semiconductor-based memory, an optically based memory, a magnetic-based memory, or a combination thereof.

These modifications can be made in light of the above detailed description. The terms used in the following claims should not be construed to limit the scope to the specific embodiments disclosed in the specification and the claims. Rather, the scope of the embodiments disclosed herein is to be determined by the following claims, which are to be construed in accordance with established doctrines of claim interpretation.

The invention claimed is:

1. A wireless device, comprising:
 a receiver to receive a downlink signal from a macro cell of a wireless communication network and a downlink signal from a small cell of the wireless communication network, the downlink signal from the macro cell comprising a first downlink signal strength at the receiver and the downlink signal from the small cell comprising a second downlink signal strength at the receiver; and
 a processor coupled to the receiver, the processor to compare the first downlink signal strength and the second downlink signal strength, and to determine whether the wireless device is to connect to the macro cell or to the small cell based on the comparison of the first downlink signal strength and the second downlink signal strength, the processor utilizing a Cell Range Expansion (CRE) offset parameter for the comparison, the CRE offset parameter being based on a speed of the wireless device and based on a ratio of downlink traffic to uplink traffic being experienced by the wireless device;
 wherein if traffic is mostly downlink traffic, the processor is configured to use no CRE offset parameter for the comparison; and
 wherein if the speed of the wireless device is greater than a threshold value, the processor is configured to adapt the CRE offset parameter to a lower value or a zero value.

2. The wireless device according to claim 1, wherein the receiver is further to receive at least one CRE offset parameter in at least one system information block information element, the at least one system information block information element comprising a System Information Block Type 3 (SIB3) information Element (IE), a System Information Block Type 4 (SIB4) IE, or a System Information Block Type 5 (SIB5) IE.

3. The wireless device according to claim 1, wherein the wireless device comprises part of a cellular telephone, smartphone, smart-type device, or tablet-type device, and
 wherein the cellular telephone, smartphone, smart-type device, or tablet-type device further comprises a touch-screen display capable of receiving input information from a touch of a user or a stylus.

4. A method of connecting to a wireless network, comprising:
 receiving at a wireless device a first downlink signal from a macro cell of the wireless communication network, the first downlink signal comprising a first downlink signal strength at the wireless device, and the macro cell comprising a coverage region;
 receiving at the wireless device a second downlink signal from a small cell of the wireless communication network, the second downlink signal comprising a second downlink signal strength at the wireless device, and the small cell comprising a coverage region that overlaps the coverage region of the macro cell;
 comparing the first downlink signal strength and the second downlink signal strength of the second downlink signal, the comparison including a Cell Range Expansion (CRE) offset parameter that is combined with the second downlink signal strength, the CRE offset parameter being based on a speed of the wireless device and based on a ratio of downlink traffic to uplink traffic being experienced by the wireless device;
 determining whether to connect to the macro cell or the small cell based on an outcome of comparing the first downlink signal strength and the second downlink signal strength; and
 connecting to macro cell or the small cell in response to the determination;
 wherein if traffic is mostly downlink traffic, said comparing comprises using no CRE offset parameter for the comparison; and
 wherein if the speed of the wireless device is greater than a threshold value, the processor is configured to adapt the CRE offset parameter to a lower value or a zero value.

5. The method according to claim 4, wherein the wireless device comprises part of a cellular telephone, smartphone, smart-type device, or tablet-type device, and
 wherein the cellular telephone, smartphone, smart-type device, or tablet-type device further comprises a touch-screen display capable of receiving input information from a touch of a user or a stylus.

6. An information-handling system, comprising:
 a transceiver to receive a downlink signal from a macro cell of a wireless communication network and a downlink signal from a small cell of the wireless communication network, each downlink signal comprising a downlink signal strength at the transceiver, the transceiver to further send an uplink signal to the macro cell if the information-handing system is connected to the macro cell and to send an uplink signal to the small cell if the transceiver is connected to the small cell; and
 a processor coupled to the transceiver, the processor to compare the first downlink signal strength and the second downlink signal strength, and to determine whether the transceiver is to connect to the macro cell or to the small cell based on the comparison of the first downlink signal strength and the second downlink signal strength, the processor utilizing a Cell Range Expansion (CRE) offset parameter that is combined with the second downlink signal strength, the CRE offset parameter being based on a speed of the information-handling system and based on a ratio of downlink traffic to uplink traffic being experienced by the information-handling system;
 wherein if traffic is mostly downlink traffic, the processor is configured to use no CRE offset parameter for the comparison; and
 wherein if the speed of the wireless device is greater than a threshold value, the processor is configured to adapt the CRE offset parameter to a lower value or a zero value.

7. The information-handling system according to claim 6, wherein the information-handling system comprises part of a cellular telephone, smartphone, smart-type device, or tablet-type device, and wherein the cellular telephone, smartphone, smart-type device, or tablet-type device further comprises a touch-screen display capable of receiving input information from a touch of a user or a stylus.

8. A non-transitory computer-readable medium having instructions stored thereon that, if executed, result in at least the following:

receiving at a wireless device a first downlink signal from a macro cell of the wireless communication network, the first downlink signal comprising a first downlink signal strength at the wireless device, and the macro cell comprising a coverage region;

receiving at the wireless device a second downlink signal from a small cell of the wireless communication network, the second downlink signal comprising a second downlink signal strength at the wireless device, and the small cell comprising a coverage region that overlaps the coverage region of the macro cell;

comparing the first downlink signal strength and the second downlink signal strength of the second downlink signal, the comparison including a Cell Range Expansion (CRE) offset parameter that is combined with the second downlink signal strength, the CRE offset parameter being based on a speed of the wireless device and based on a ratio of downlink traffic to uplink traffic being experienced by the wireless device; and determining whether to connect to the macro cell or the small cell based on an outcome of comparing the first downlink signal strength and the second downlink signal strength;

wherein if traffic is mostly downlink traffic, said comparing comprises using no CRE offset parameter for the comparison; and wherein if the speed of the wireless device is greater than a threshold value, the processor is configured to adapt the CRE offset parameter to a lower value or a zero value.

\* \* \* \* \*